United States Patent
Chowdhury

(10) Patent No.: US 8,176,459 B2
(45) Date of Patent: May 8, 2012

(54) SYSTEM AND METHOD FOR SELECTING GATES IN A LOGIC BLOCK

(75) Inventor: Salim U. Chowdhury, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 244 days.

(21) Appl. No.: 12/332,013

(22) Filed: Dec. 10, 2008

(65) Prior Publication Data

US 2010/0146469 A1    Jun. 10, 2010

(51) Int. Cl.
  G06F 9/455   (2006.01)
  G06F 17/50   (2006.01)
(52) U.S. Cl. ........ 716/133; 716/106; 716/108; 716/109; 716/132; 716/135
(58) Field of Classification Search .................. 716/106, 716/108, 109, 132–135; 703/19
  See application file for complete search history.

(56) References Cited

U.S. PATENT DOCUMENTS

| | | | |
|---|---|---|---|
| 6,209,122 B1 * | 3/2001 | Jyu et al. | 716/113 |
| 7,441,211 B1 * | 10/2008 | Gupta et al. | 716/2 |
| 2004/0196684 A1 * | 10/2004 | Katoh et al. | 365/149 |
| 2006/0206845 A1 * | 9/2006 | Rao et al. | 716/6 |
| 2007/0180415 A1 * | 8/2007 | Pundoor | 716/6 |
| 2009/0256609 A1 * | 10/2009 | Naffziger | 327/203 |

OTHER PUBLICATIONS

Morgenshtein et al., Timing Optimization in Logic With Interconnect, SLIP '08, Apr. 5-6, 2008, Newcastle, UK, pp. 19-26.
Coudert, Gate Sizing for Constrained Delay/Power/Area Optimization, IEEE, 1997, pp. 465-472.
Aloul et al., Generic ILP Versus Specialized 0-1 ILP: An Update, University of Michigan, pp. 1-8.
Sapatnekar, Efficient Calculation of All-Pairs Input-To-Output Delays in Synchronous Sequential Circuits, IEEE, 1996, pp. 520-523.
Design Compiler Reference Manual: Optimization and Timing Analysis, v.1999.10, pp. A1-A40.

* cited by examiner

*Primary Examiner* — Jack Chiang
*Assistant Examiner* — Nha Nguyen
(74) *Attorney, Agent, or Firm* — Brooks Kushman P.C.

(57) ABSTRACT

For each of a plurality of interconnected gates forming one or more non-critical timing paths through a logic block, a gate size may be selected based on (i) a gate delay, (ii) a change in gate delay and gate power associated with downsizing the gate to a next available gate size, and (iii) signal arrival times at one or more inputs and outputs of the gate to minimize power consumed by the logic block while maintaining a specified cycle time.

19 Claims, 1 Drawing Sheet

SYSTEM AND METHOD FOR SELECTING GATES IN A LOGIC BLOCK

BACKGROUND

A logic gate performs a logical operation on one or more logic inputs and may produce one or more logic outputs. Because the output is also a logic-level value, an output of one logic gate can connect to the input of one or more other logic gates. The logic normally performed is Boolean logic and is most commonly found in digital circuits. Logic gates are primarily implemented electronically using diodes or transistors, but can also be constructed using electromagnetic relays, fluidics, optics, molecules or mechanical elements.

In electronic logic, a logic level is represented by a voltage or current. Each logic gate requires power so that it can source and sink currents to achieve the correct output voltage.

Several techniques for selecting gate sizes in a logic block are known. Some of these techniques explicitly enumerate timing paths within the logic block and are thus computationally intensive. Other techniques apply heuristics and are thus less rigorous in achieving power optimization or required timing constraints.

SUMMARY

A gate selection system for a logic block may include one or more computers. The one or more computers may be configured to partition interconnected gates forming a plurality of timing paths into at least two subsets based on gate and interconnect delay of each of the timing paths. The one or more computers may be further configured to, for each gate of at least one of the subsets, select a gate size based on (i) the gate delay, (ii) a change in gate delay and gate power associated with downsizing the gate to a next available gate size, and (iii) signal arrival times at one or more inputs and outputs of the gate to minimize power consumed by the logic block while maintaining a specified cycle time.

A gate selection method for a logic block may include, for each of a plurality of interconnected gates forming one or more non-critical timing paths through the logic block, electronically selecting a gate size based on (i) a gate delay, (ii) a change in gate delay and gate power associated with downsizing the gate to a next available gate size, and (iii) signal arrival times at one or more inputs and outputs of the gate to minimize power consumed by the logic block while maintaining a specified cycle time.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Digital logic blocks of modern day integrated circuits such as microprocessors and ASICS may include gates from a library. Usually, there are multiple sizes for each gate type. Each size may have an associated power and delay. Gates may thus be selected to improve cycle time in the critical timing path (the timing path between (i) a primary input and primary output of the logic block having the maximum delay, (ii) a primary input and sequential element (flop, latch, combinations thereof, etc.) of the logic block having the maximum delay, (iii) two sequential elements of the logic block having the maximum delay, or (iv) a sequential element and primary output of the logic block having the maximum delay) or to reduce power consumption in non-critical timing paths (the timing paths between (i) a primary input and primary output of the logic block having delays less than the required cycle time, (ii) a primary input and sequential element of the logic block having delays less than the required cycle time, (iii) two sequential elements of the logic block having delays less than the required cycle time, or (iv) a sequential element and primary output of the logic block having delays less than the required cycle time).

Power may be minimized by downsizing the gates. Downsizing a gate, however, may increase the timing delay within the gate. Thus, downsizing is constrained by the fact that path-delay via the gates cannot be more than the specified cycle time.

The number of timing paths and sub-paths in a logic block may be innumerable. Certain embodiments presented herein do not explicitly enumerate all timing paths. Rather, timing constraints may be formulated in terms of arrival times at inputs and outputs of the logic gates. Together with the timing requirements at the input and output ports of the design (and the setup times of any sequential elements), gates may be selected to minimize power consumption while meeting cycle time constraints for all non-critical timing paths.

An analytical formulation for down-sizing gates in non-critical timing paths in terms of a Integer Linear Program (ILP) is presented below. The objective is to minimize power (dynamic and leakage) subject to timing constraints in the timing paths. As mentioned above, the timing paths are not explicitly enumerated. Rather, they are considered implicitly by propagating arrival times within each gate in the region of interest. An iterative algorithm is also presented which allows for an accurate determination of timing delays and slews.

Figure 1:
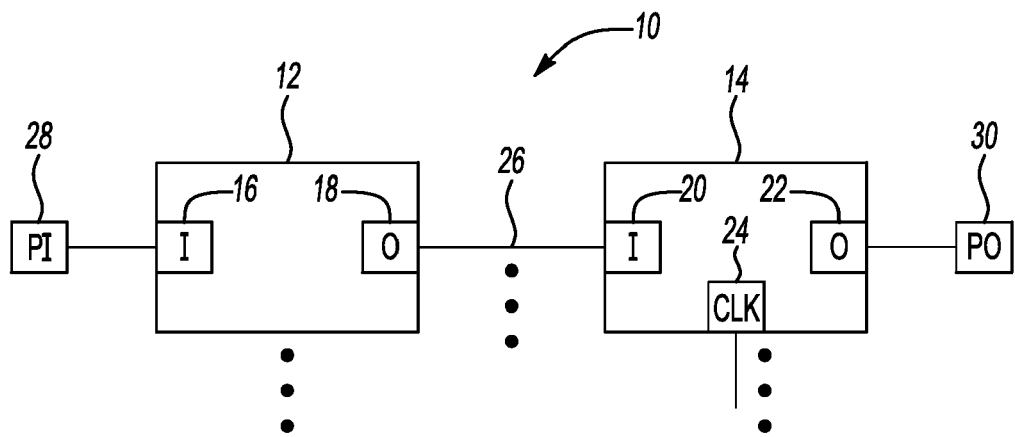
FIG. 1 is a block diagram of an example logic block.

Referring now to FIG. 1, an example logic block 10 includes a gate 12 and flop 14 (a particular type of gate). As apparent to those of ordinary skill, the gate 12 includes an input and output node 16, 18. As such, the gate 12 has a single timing arc between the input and output 16, 18. The flop 14 includes an input and output node 20, 22 as well as a clock node 24. The output 18 of the gate 12 is electrically connected with the input 22 of the flop 14 via an interconnect 26. The input 20 of the flop 14 is a fan-out node relative to the output 18 of the gate 12. The logic block 10 also include a primary input 28 and a primary output 30. Of course, any number (and type) of gates may be interconnected between the primary inputs and outputs 28, 30. Similarly, such gates may include any number of inputs and/or outputs (and corresponding timing arcs).

Figure 2:
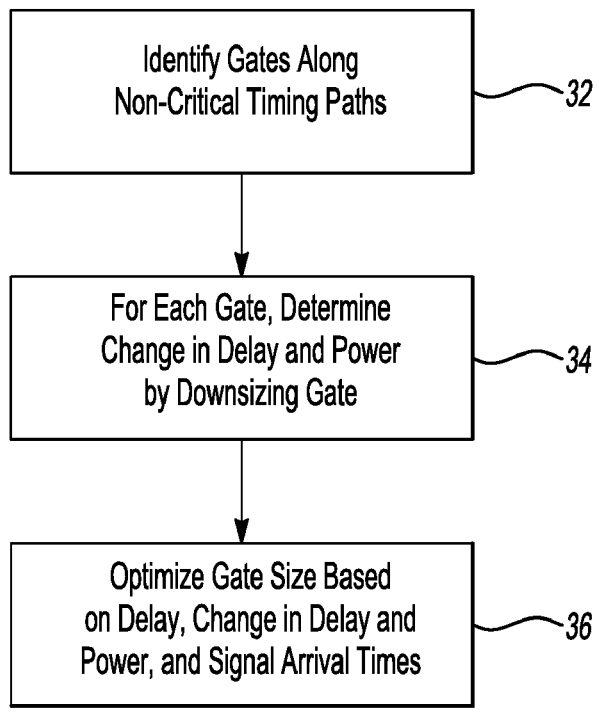
FIG. 2 is a flow chart of an example algorithm for selecting gate sizes of a logic block.

Referring now to FIG. 2, gates forming non-critical timing paths are identified as indicated at 32. As known to those of ordinary skill, several techniques are available to facilitate such identification based on, for example, gate and interconnect delay of the timing paths. For example, the PERT technique as described by S. S. Sapatnekar, "Efficient Calculation of All-Pairs Input-to-Output Delays in Synchronous Sequential Circuits," IEEE Xplore, pp. 520-523, 1996, may be used. Of course, any suitable technique may be used.

As indicated at 34, changes in gate power and gate delay are determined for each of the gates identified at 32. As known to those of ordinary skill, a difference in gate power between a current gate and a next available downsized gate may be computed from a look-up table (or library) storing such information. Likewise, a difference in gate delay between a current gate and a next available downsized gate may be computed from a look-up table storing such information. Any suitable technique, however, may be used.

As indicated at 36, gate sizes are optimized based on gate delay, changes in gate delay and power from down sizing the gates to the next available gate size, and signal arrival times. In some embodiments, an iterative method may be used where within a single iteration, a gate is allowed to change only to the next lower size. In such cases, 0/1 ILP techniques may be used. 0/1 ILP techniques may make it possible to compute gate and interconnect delay/slew values more accurately.

As known to those of ordinary skill, the delay/slew values with respect to a gate in an interconnect topology depend on the input slew values. The input slew values are dependent on the sizes of the gates. In embodiments using 0/1 ILP, the size of a gate may be allowed to change only to the next lower size. Thus, the design is perturbed only slightly and hence current input slew values may be considered valid to compute the gate delay values and the slew values at the outputs of the gates. In other embodiments, however, the size of a gate may be allowed to change to any available size.

Example Problem Formulation

Let G be the set of all gates in the non-critical timing paths identified at 32 (where timing slack $\geq$ some given threshold $S_{th}$, which is usually 0).

Let N be the set of all timing nodes belonging to the input(s) or output(s) of these gates. The following are defined at each node:

$T_{ai}$: the arrival time at node i;

$S_i$: the slew rate (also called "transition time") at node i.

Usually, the slew at a given node is bounded within a user specified range $[S_{min}, S_{max}]$. Slews may be modified due to downsizing of a gate. The modified slews should remain within the specified range. In certain embodiments, the following two constraints should be satisfied:

$$S_i \geq S_{min};\qquad(1)$$

and $$S_i \leq S_{max}.\qquad(2)$$

For each gate-type, it is assumed that a set of sizes are provided in a library L. For each gate i for which a lower size is available in the library L, the following is computed using any suitable known technique:

$d_{gj}$: delays in the gate (for all timing arcs j within the gate) for the current size;

$d_{gfk}$: delays from the output(s) to the fan-out nodes (for all fan-out nodes k for gate g), for the current size of the gate;

$\Delta d_{gj}$: change in $d_{gj}$ if the gate is downsized; and $\Delta d_{gfk}$: change in $d_{gfk}$ if the gate is downsized.

For a gate g C G, if the gate has a lower size available in the library L, the slew at the output(s) and at the fan-out nodes is computed for the gate g assuming a lower size for the gate. For each gate that can meet the slew constraints of (1) and (2) if downsized, a variable $x_g$ is defined which is assumed to take on values of 0 or 1 where $x_g=0$ indicates that the gate g will not be downsized; and $x_g=1$ indicates that the gate g will be downsized.

$\Delta P_g$, which is the change in power if the gate is downsized, is also computed for gate g using any suitable known technique.

The objective is to $$\text{maximize } P = \sum_{g \in G} x_g \Delta P_g \qquad(3)$$

which represents the power savings over all gates in the set G.

Timing constraints may be cast in terms of the variable $x_g$. For each gate g, the following constraints may be set for each arc j in gate g, where ji is the input pin for arc j and jo is the output pin for the arc j:

$$T_{agjo} \geq T_{agji} + d_{gj} + x_g \Delta d_{gj} \qquad(4)$$

where $T_{agjo}$ is the signal arrival time at the output of gate j; and $T_{agji}$ is the signal arrival time at the input of gate j.

$$T_{agfk} \geq T_{agfo} + d_{gfk} + x_g \Delta d_{gfk} \qquad(5)$$

where $T_{agfk}$ is the signal arrival time at the far end of the interconnect connected with the output of the gate g;

$T_{agfo}$ is the signal arrival time at the near end of the of the interconnect connected with an output of the gate g;

$gf_k$ is the k-th fan-out for gate g;

$gf_o$ is the corresponding output node for the gate g;

$d_{gfk}$ is the existing interconnect delay to fan-out node $f_k$; and $\Delta d_{gfk}$ is the additional corresponding delay if gate g is downsized.

Note that constraints (4) and (5) are to be defined for all gates in the set G irrespective of whether the gates can be downsized. Objective (3), however, involves only the gates which can be downsized. (For consecutive gates with $x_g=0$, it is possible to rewrite the equations to reduce the number of variables and equations to account for gates that are not changing in size as apparent to those of ordinary skill.) In the case a gate cannot be downsized, $x_g=0$ in constraints (4) and (5).

The power savings $\Delta P$ for a downsized sequential element may be computed using any known technique. The timing requirements, however, may need special attention as a sequential element separates input side timing paths from output side timing paths. Setup constraints may be involved on the input side and thus the change in setup time, $\Delta d_{gsetup}$, is computed if downsized. On the output side, the change in clock arrival time, $\Delta d_{gclk-q}$, and the additional delays to the fan-out nodes is computed as above.

Let T be the cycle time after adjusting for clock skew, clock jitter, etc. The constraints with respect to a sequential element (gate g) are then:

$$T \geq T_{agd} + d_{gsetup} + x_g \Delta d_{gsetup}; \qquad(6)$$

and $$T_{agfk} \geq T_{agc0} + d_{gclk-q} + x_g \Delta d_{gclk-q} + d_{gfk} + x_g \Delta d_{gfk}. \qquad(7)$$

where $T_{agd}$ is the signal arrival time at input d for the sequential element g;

$d_{gsetup}$ is the setup time for the sequential element g;

$T_{agfk}$ is the signal arrival time at the far-end interconnect node $f_k$ (fan-out k) for gate g;

$T_{agc0}$ is the clock arrival time for sequential element g; and $d_{gclk-q}$ is the delay from clock to output q for a sequential element g.

In addition, at the primary output(s):

$$T_{anout} \leq RAT_{nout} \quad (8)$$

where $T_{anout}$ is the arrival time at the primary output node "nout"; and $RAT_{nout}$ is the given required arrival time at the node "nout."

Finally, the given arrival times at the primary input(s):

$$T_{anin} = AT_{nin} \quad (9)$$

where $T_{anin}$ represents the arrival time at the input port "nin" and is equal to the specified arrival time $AT_{nin}$ (Other similar/suitable problem formulations may also be used.)

Example Algorithm

1. Let $G_0$ be the set of gates such that the worst slack for each $g \in G_0$ is greater than $S_{th}$. $G = G_0$. In other embodiments, $G_0$ may be divided into multiple subsets (e.g., $G_1$, $G_2$). In some embodiments, gates in these subsets may be directly connected. In other embodiments, gates in these subsets may not be directly connected. The algorithm may then be sequentially iterated over each of the subsets.
2. For each output port {
       setup constraint (8);
   }
       for each input port {
           setup constraint (9);
       }
3. For each $g \in G$ {
       if the cell for g is not a sequential element {
           compute $d_{gj}$ for each timing arc j within the gate g;
       } else {
           compute $d_{gsetup}$ and $d_{gclk-q}$;
       }
       compute $d_{gfk}$ for each fan-out fk for gate g;
       compute power $P_g$ for the gate g;
   }
4. For each $g \in G$ {
       if a lower size does not exist for g in the library L {
           set $x_g = 0$;
           $G = G - \{g\}$;
       }
   }
5. For each $g \in G$ {
       if the cell for g is not a sequential element {
           compute $d_{gj-new}$ for each timing arc j within the gate g for the next lower power level;
       else { // it is a sequential element
           compute $d_{gclk-q-new}$ for the gate g for the next lower power level;
           compute $d_{gsetup-new}$ for the gate g for the next lower power level;
       }
       obtain the worst $s_{out-max}$ at the output node(s) for the gate g for the next lower power;
       if ($s_{out-max} > S_{max}$){
           $G = G - \{g\}$;
           continue; // with next g
       }
       obtain the best $s_{out-min}$ at the output node(s) for the gate g for the next lower power;
       if ($s_{out-min} < S_{min}$){
           $G = G - \{g\}$;
           continue; // with next g
       }
       compute $d_{gfk-new}$ for each fan-out fk for the gate g for the next lower power level;
       obtain the worst $s_{fk-max}$ at the fan-out node(s) for the gate g for the next lower power;
       if ($s_{fk-max} > S_{max}$){
           $G = G - \{g\}$;
           continue; // with next g
       }
       obtain the best $s_{fk-min}$ at the fan-out node(s) for the gate g for the next lower power;

if ($s_{fk-min} < S_{min}$){
           $G = G - \{g\}$;
           continue; // with next g
       }
       compute $P_{g-new}$ for the gate g for the next lower level;
       compute $\Delta_{pg} = P_g - P_{g-new}$;
       if the cell for g is not a sequential element {
           compute $\Delta d_{gj} = d_{gj-new} - d_{gj}$ for each timing arc j in the gate g;
       } else { // this cell is a sequential element
           compute $\Delta d_{gsetup} = d_{gsetup-new} - d_{gsetup}$; and
           compute $\Delta d_{gclk-q} = d_{gclk-q-new} - d_{gclk-q}$;
       }
       compute $\Delta d_{gfk} = d_{gfk-new} - d_{gfk}$ for each fan-out fk for the gate g;
   }
6. For each gate $g \in G_0$ {
       if ($g \in G$) {
           setup objective function (3);
       }
       else {
           $x_g = 0$;
       }
       if (gate g is not a flop) {
           setup constraints (4) and (5);
       }
       else {
           setup constraints (6) and (7);
       }
   }
7. Solve the 0/1 ILP problem defined by objective function (3) and the constraints (4), (5), (6), (7), (8) and (9);
8. For each gate $g \in G$ {
       if ($x_g = 1$) {
           $P_g = P_{g-new}$;
           if (gate g is not a sequential element) {
               $d_{gj} = d_{gj-new}$;
           }
           else {
               $d_{gsetup} = d_{gsetup-new}$ and
               $d_{gclk-q} = d_{gclk-q-new}$;
           }
       }
   }
9. Repeat steps 5, 6, 7 and 8 until all $x_g = 0$;

A further iterative scheme may be defined to repeat the algorithm starting with step 1 where a new set $G_0$ is defined. (Note that downsizing certain gates may reduce loading in the timing critical region such that some gates which were in the critical timing path may no longer be in the next iteration.) Other suitable algorithms may also be used.

As apparent to those of ordinary skill, the algorithms disclosed herein may be deliverable to a processing device in many forms including, but not limited to, (i) information permanently stored on non-writable storage media such as ROM devices and (ii) information alterably stored on write-able storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gate selection system for a logic block comprising: one or more computers configured to
    partition interconnected gates forming a plurality of timing paths into at least two subsets based on gate and interconnect delay of each of the timing paths,
    for each of the gates of at least one of the subsets, compute slew values at outputs and fan-out nodes based on an available smaller gate size in a library, and
    for the gates having slew values that meet a slew constraint, concurrently select gate sizes based on (i) gate delays, (ii) changes in gate delays and gate powers associated with downsizing the gates to next respective available gate sizes, and (iii) signal arrival times at one or more inputs and outputs of the gates to globally minimize power consumed by the logic block while maintaining a specified cycle time.

2. The system of claim 1 wherein the at least one subset includes non-critical timing path gates.

3. The system of claim 1 wherein the gate sizes are selected further based on respective transition times of the gates.

4. The system of claim 1 wherein the gate sizes are selected further based on input-side setup times of at least some of the gates.

5. The system of claim 1 wherein the gate sizes are selected further based on output-side clock-to-output delays of at least some of the gates.

6. The system of claim 1 wherein the gate sizes are selected further based on the interconnect delays between the gates and respective adjacent down stream gates.

7. The system of claim 1 wherein the gate sizes are selected further based on interconnect transition times.

8. A gate selection method for a logic block comprising:
    for each of a plurality of interconnected gates forming one or more non-critical timing paths through the logic block, computing slew values at outputs and fan-out nodes based on an available smaller gate size in a library; and
    for the gates having slew values that meet a slew constraint, concurrently selecting, by a computer, gate sizes based on (i) gate delays, (ii) changes in gate delays and gate powers associated with downsizing the gates to next respective available gate sizes, and (iii) signal arrival times at one or more inputs and outputs of the gates to globally minimize power consumed by the logic block while maintaining a specified cycle time.

9. The method of claim 8 wherein concurrently selecting the gate sizes is further based on respective transition times of the gates.

10. The method of claim 8 wherein concurrently selecting the gate sizes is further based on input-side setup times of at least some of the gates.

11. The method of claim 8 wherein concurrently selecting the gate sizes is further based on output-side clock-to-output delays of at least some of the gates.

12. The method of claim 8 wherein concurrently selecting the gate sizes is further based on the interconnect delays between the gates and respective adjacent down stream gates.

13. The method of claim 8 wherein concurrently selecting the gate sizes is further based on interconnect transition times.

14. A computer-readable storage medium having instructions stored thereon that, when executed, cause a computer to:
    compute, for each of a plurality of interconnected gates forming one or more non-critical timing paths through a logic block, slew values at outputs and fan-out nodes based on an available smaller gate size in a library, and
    concurrently select, for the gates having slew values that meet a slew constraint, gate sizes based on (i) gate delays, (ii) changes in gate delays and gate powers associated with downsizing the gates to next respective available gate sizes, and (iii) signal arrival times at one or more inputs and outputs of the gates to globally minimize power consumed by the logic block while maintaining a specified cycle time.

15. The medium of claim 14 wherein the instructions stored thereon further cause, when executed, the computer to select the gate sizes based on respective transition times of the gates.

16. The medium of claim 14 wherein the instructions stored thereon further cause, when executed, the computer to select the gate sizes based on input-side setup times of at least some of the gates.

17. The medium of claim 14 wherein the instructions stored thereon further cause, when executed, the computer to select the gate sizes based on output-side clock-to-output delays of at least some of the gates.

18. The medium of claim 14 wherein the instructions stored thereon further cause, when executed, the computer to select the gate sizes based on the interconnect delays between the gates and respective adjacent down stream gates.

19. The medium of claim 14 wherein the instructions stored thereon further cause, when executed, the computer to select the gate sizes based on interconnect transition times.

* * * * *